(12) United States Patent
Gao et al.

(10) Patent No.: US 8,990,830 B2
(45) Date of Patent: Mar. 24, 2015

(54) THREAD MANAGEMENT IN PARALLEL PROCESSES

(75) Inventors: Yaoqing Gao, Ontario (CA); Francois Gibello, Montpellier (FR); Eric Michel, Montpellier (FR); Nicolas Tallet, Montpellier (FR); Pascal Vezolle, Montpellier (FR)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 13/545,262

(22) Filed: Jul. 10, 2012

(65) Prior Publication Data

US 2013/0024871 A1     Jan. 24, 2013

(51) Int. Cl.
G06F 9/46     (2006.01)
G06F 9/50     (2006.01)
G06F 9/48     (2006.01)

(52) U.S. Cl.
CPC .............. *G06F 9/5083* (2013.01); *G06F 9/485* (2013.01)
USPC .......................................... 718/105; 718/104

(58) Field of Classification Search
None
See application file for complete search history.

(56) References Cited

U.S. PATENT DOCUMENTS

| | | | | |
|---|---|---|---|---|
| 6,098,169 A * | 8/2000 | Ranganathan | ................. | 712/227 |
| 7,853,937 B2 * | 12/2010 | Janczewski | ................... | 717/149 |
| 8,087,029 B1 * | 12/2011 | Lindholm et al. | ............ | 718/105 |
| 8,321,849 B2 * | 11/2012 | Nickolls et al. | ............... | 717/146 |
| 8,732,439 B2 * | 5/2014 | Lippett | ......................... | 712/214 |
| 2009/0150890 A1 * | 6/2009 | Yourst | .......................... | 718/102 |
| 2009/0150898 A1 * | 6/2009 | Sohn et al. | ..................... | 718/105 |
| 2009/0165006 A1 * | 6/2009 | Ceze et al. | ..................... | 718/102 |
| 2010/0077185 A1 * | 3/2010 | Gopalan et al. | ............... | 712/220 |
| 2010/0281489 A1 * | 11/2010 | Lee et al. | ........................ | 718/106 |
| 2011/0067029 A1 * | 3/2011 | Wolfe et al. | .................... | 718/102 |
| 2011/0191776 A1 * | 8/2011 | Bose et al. | ...................... | 718/102 |
| 2011/0197195 A1 * | 8/2011 | Cai et al. | ........................ | 718/102 |
| 2011/0283262 A1 * | 11/2011 | Ceze et al. | ..................... | 717/128 |
| 2013/0191817 A1 * | 7/2013 | Vorbach | ......................... | 717/150 |
| 2013/0312003 A1 * | 11/2013 | Lee et al. | ....................... | 718/104 |

* cited by examiner

*Primary Examiner* — Kenneth Tang
(74) *Attorney, Agent, or Firm* — Matthew C. Zehrer

(57) ABSTRACT

A method and system are provided for thread management in parallel processes in a multi-core or multi-node system. The method includes receiving monitored hardware metrics information from the multiple cores or multiple nodes on which processes are executed, receiving monitored process and thread information; and globally monitoring the processing across the multiple cores or multiple nodes. The method further includes analyzing the monitored information to minimize imbalances between the multiple cores and/or to improve core or node exploitation and dynamically adjusting the number of threads per process based on the analysis.

15 Claims, 6 Drawing Sheets

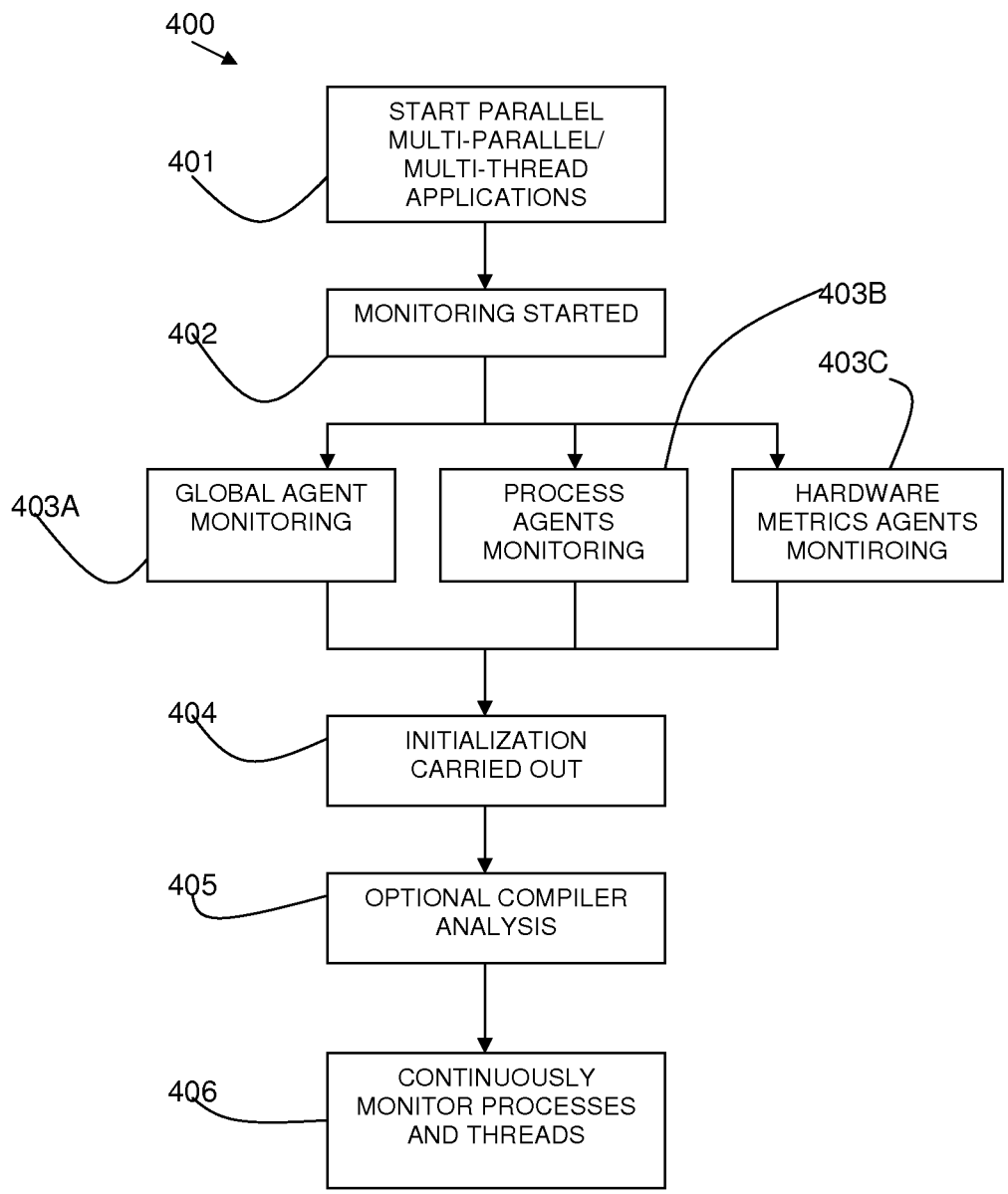

THREAD MANAGEMENT IN PARALLEL PROCESSES

BACKGROUND

This invention relates to the field of thread management in parallel processes. In particular, the invention relates to thread management in a parallel processes in a multi-core or multi-node systems.

SUMMARY

Coarse-grained distributed parallelism using message passing libraries is the traditional method to implement High Performance Computing (HPC) applications and to exploit clustered architectures. The single-thread approach consists of having one process per core. This approach can no longer tackle the multi-level parallelism and complexity of new processor architectures.

Computer systems on which parallel processes are executed may include multiple core processors (including virtual and/or physical cores) in a single computing component referred to herein as multi-core systems, or multiple processor nodes in distributed computing components with inter-node communication via a network referred to herein as multi-node systems, or a combination of multi-core and multi-node systems. The term "process" is used to define a process or process carried out on a node or core which may include multiple threads within the process.

The mixed multi-process/multi-threads method is one of the main and most popular solutions to take advantage of the steady increase of the number of physical and virtual (Simultaneous Multi-Threading (SMT) feature) cores per processor as well as the serial sustained performance per core.

The most common parallel method of using a multi-levels implementation for HPC applications is to use a Message Passing Interface (MPI) over the processes and a fixed number of threads within the processes, with a single thread per physical or virtual core. For example, using OpenMP (Open Multi-Processing, OpenMP is a trade mark of OpenMP Architecture Review Board) implementation and POSIX (Portable Operating System Interface for Unix, POSIX is a trade mark of IEEE) threads. OpenMP is an Application Programming Interface (API) that supports multi-platform shared memory multi-processing programming in C, C++, and Fortran, on most processor architectures and operating systems. POSIX (Portable Operating System Interface for Unix, Unix is a trade mark of The Open Group) is a family of related standards specified by the IEEE to define the APIs, along with shell and utilities interfaces for software compatible with variants of the Unix operating system, although the standard can apply to any operating system.

Based on a pool of dedicated resources there are several dynamic techniques to optimize the number of threads per process. All these techniques are generally static and only perform a local optimization on the performance per process A parallel application is launched on a dedicated set of allocated resources made of a set of computer nodes with physical or virtual cores. The nodes are interconnected with a high performance network for inter-node communications. Depending on the user requirements, a scheduling system allocates one or more cores per process. The number of threads per process is generally statically defined at the beginning of the execution.

Therefore, there is a need in the art to address the aforementioned problem.

According to a first aspect of the present invention there is provided a method for thread management in parallel processes, comprising: receiving monitored hardware metrics information from the multiple cores or multiple nodes on which processes are executed; receiving monitored process and thread information; globally monitoring the processing across the multiple cores or multiple nodes; analyzing the monitored information to minimize imbalances between the multiple cores and/or to improve core or node exploitation; and dynamically adjusting the number of threads per process based on the analysis.

According to a second aspect of the present invention there is provided a system for thread management in parallel processes in a multi-core and multi-node system, comprising: multiple processor cores or nodes; hardware metrics monitoring agents for monitoring hardware metrics on each of the multiple processor cores or nodes; process and thread monitoring agents for monitoring the process and threads running on the multiple processor cores or nodes; a global monitoring agent for globally monitoring the processing across the multiple cores or multiple nodes; a thread management system including: an analyzer component for analyzing the monitored information to minimize imbalances between the multiple cores or nodes and/or to improve core or node exploitation; and a thread adjustment component for dynamically adjusting the number of threads per process based on the analysis.

According to a third aspect of the present invention there is provided a computer program stored on a computer readable medium and loadable into the internal memory of a digital computer, comprising software code portions, when said program is run on a computer, for performing the method of the first aspect of the present invention.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIGS. 4A and 4B are flow diagrams of methods in accordance with the present invention.

Figure 1:
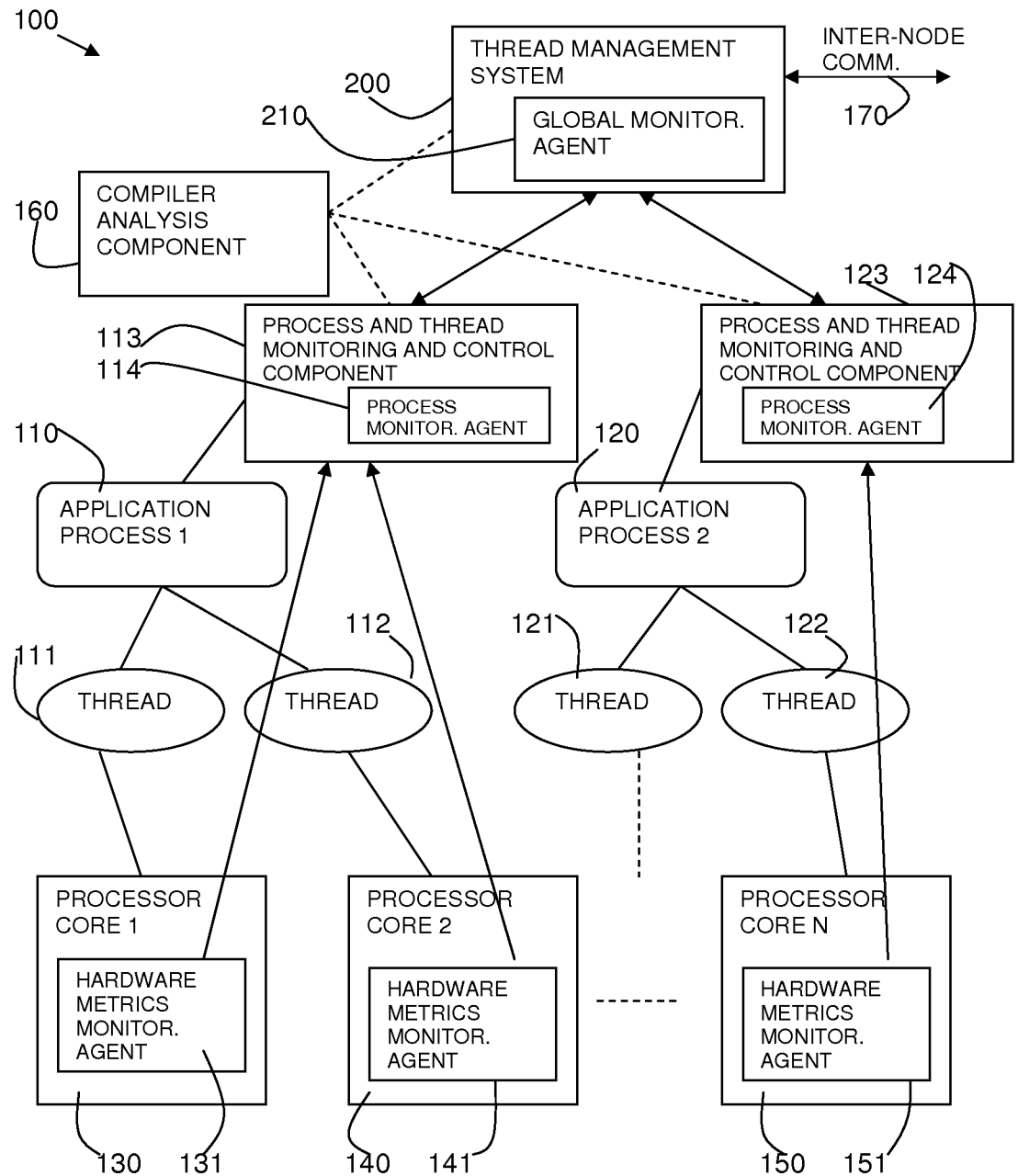
FIG. 1 is block diagram of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A runtime method and system are described to monitor dynamically and adapt the number of threads per distributed process in a multi-core and/or multi-node environment. The described method and system may combine hardware metrics monitoring, compiler analysis and runtime profiling, in accordance with a defined pool of resources/cores.

Most HPC applications use a SPMD (Single Program Multiple Data) model where the threaded-parallel constructions are generally repetitively executed. The solution of the described method and system is to use hardware counters to monitor the performance of each thread/process at the execution time and to gather derived metrics to determine dynamically the performance per process, in and out of the multi-threaded parallel sections. In addition, compiler analysis and runtime profiling may be used.

The number of threads per process on the locally allocated cores or across system nodes may be dynamically adjusted globally. The number of threads may be adjusted by correlating the individual metric per thread in order to optimize the overall performance of the multi-core or multi-node parallel application. The number of threads per process may be adjusted to reduce the imbalance of the parallel execution and/or to improve the serial efficiency per node or core.

Based on a predefined policy, some performance derived metrics may be evenly collected and centralized on every node or core and used to define the optimal number of threads per threaded parallel constructions within each process. The described method and system adjust dynamically the number of threads per process from a global view of the behaviour of all the processes. This is done by hardware monitoring capabilities and, optionally, compiler analysis, in order to reduce the imbalance between the processes and increase the performance per core or node.

The described system may also have the capability to modify system parameters to maximize the hardware resources utilization. Depending on the analysis of the hardware resources utilization, the system may increase or decrease the number of threads per core or node by enabling or disabling the hardware multi-threading mechanism allowing several simultaneous threads per physical core or node. The system may also adapt the frequency of the hardware components, the memory configuration and policy, process and thread scheduling. The described system may also generate an output monitoring file for the compiler to do profile-feedback directed optimization.

Referring to FIG. 1, a block diagram shows an example embodiment of the described system 100.

Application processes 110, 120 may each have multiple threads 111, 112, 121, 122 which run in parallel on multiple physical or virtual processor cores or nodes 130, 140, 150. The system 100 may include multiple cores 130, 140, 150 which may be physical or virtual cores in a computer system. Alternatively or additionally, the system may have multiple nodes in the form of processor nodes distributed across multiple computer systems with inter-node communication 170.

Monitoring agents may be provided. There may be a global monitoring agent 210 which may be part of a thread management system 200 which may gather the data and communicate with a global accent gathering all the data from the different cores or nodes 130, 140, 150. There may also be process monitoring agents 114, 124 each in charge of monitoring one or more processes (mainly metrics from hardware counters, parallel section identification and indexation), with one or several processes per agent 114, 124 depending on the size of the system (i.e., the number of physical/virtual cores). There may also be hardware metrics monitoring agents 131, 141, 151, with normally one agent 131, 141, 151 per physical core or node to get the hardware counters.

The hardware metrics monitoring agents 131, 141, 151 may be provided on each of the physical or virtual processor cores or nodes 130, 140, 150. The hardware metrics monitoring agents 131, 141, 151 together with the global monitoring agent 210 may identify and index the parallel sections. This may be triggered by the system code using Application Programming Interfaces (APIs). The hardware monitoring agents 131, 141, 151 may then monitor hardware metrics using hardware counts on each core 130, 140, 150. Hardware performance counters are a set of special-purpose registers built into modem microprocessors to store the counts of hardware-related activities within computer systems. The hardware monitoring agents 131, 141, 151 may be configured to monitor some specific hardware counters based on a global policy and metrics to adjust the number of threads per process.

The described system 100 may include process and thread monitoring and control components 113, 123 for monitoring and controlling the application processes 110, 120. The process and thread monitoring and control components 113, 123 may use information from process monitoring agents 114, 124 as well as the gathered hardware metrics from the agents 131, 141, 151.

A compiler analysis component 160 may optionally be provided which may analyze the process and thread monitoring components' 113, 123 outputs and provide analyzed information for the compiler. For example, the outputs may include: the time spend in each parallel construction, the overhead to manage the threads, the imbalance between the threads (which can be due to different workloads per thread, use of the hardware units, source, etc.). This information may be used by the compiler to generate potentially better optimized codes by, for instance, changing some optimizations techniques. However, this aspect is not dynamic. It is an added feature of the system knowing that the system may be strongly coupled with the multi-threaded runtime part of the compiler runtime (at least for OpenMP approach).

A thread management system 200 may receive monitored information from the process and thread monitoring and control components 113, 123 including the hardware metrics monitored information and, optionally, the compiler analysis from the compiler analysis component 160.

The thread management system 200 may build derived metrics and determine an optimal number of threads per process in each parallel construction based on the monitored information and the compiler analysis. Parameters of the system 100 may then be configured and the threads adjusted via the process and thread monitoring and control components 113, 123. The parameters may include: the SMT configuration (including the number of simultaneous threads per physical core, i.e. virtual cores), frequency, process/thread scheduling, policy memory, etc.

Figure 2:
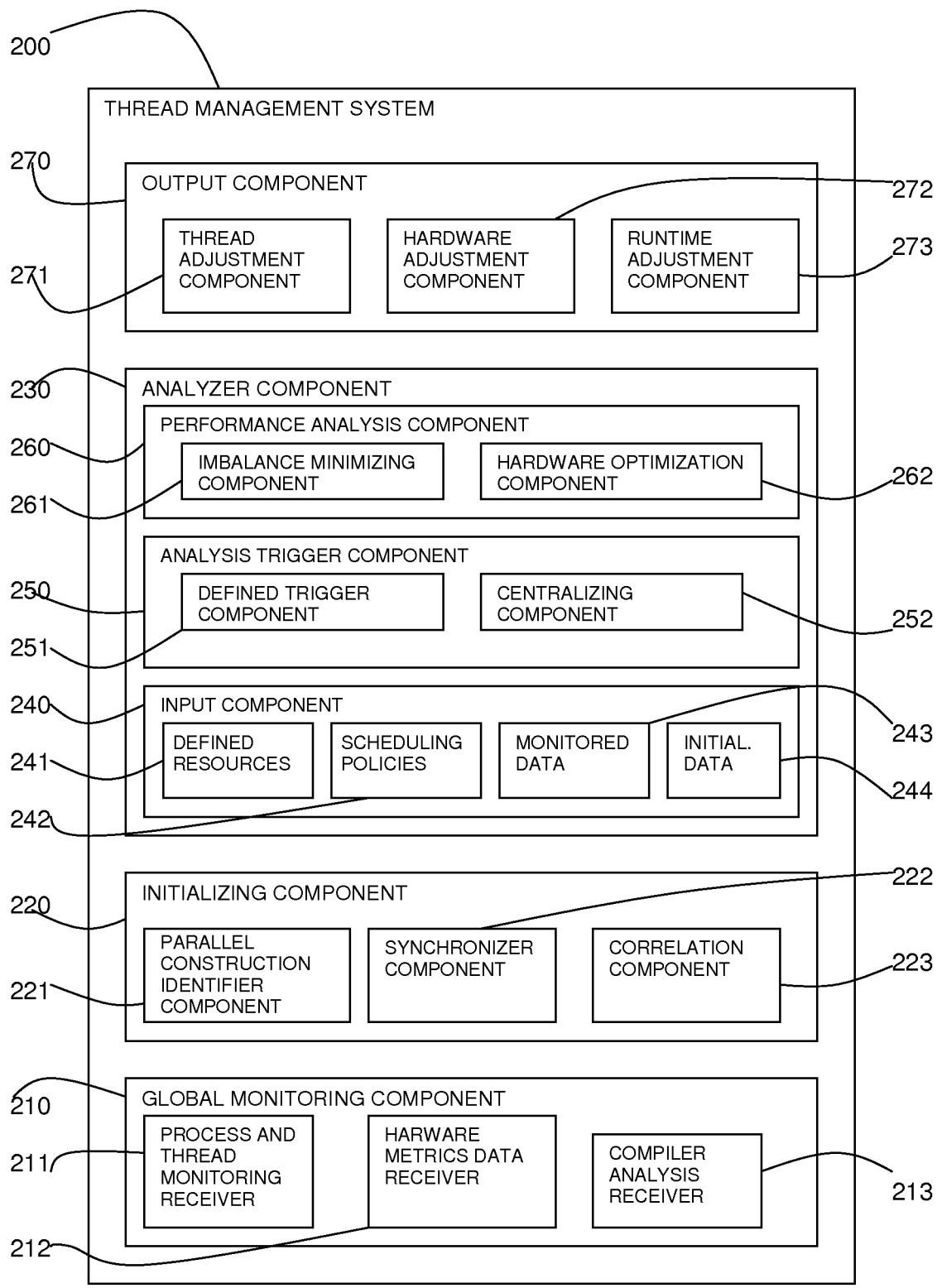
FIG. 2 is a block diagram of an aspect of the system in accordance with the present invention.

Referring to FIG. 2, an example embodiment of the thread management system 200 is described. The thread management system 200 may include a global monitoring component 210 including: a process and thread monitoring receiver 211 and a hardware metrics receiver 212 for receiving the monitored data. Optionally, a compiler analysis receiver 213 may be provided for receiving information from a compiler analysis component analyzing process and thread monitoring of application processes.

The thread management system 200 may include an initializing component 220 for initializing and identification of data on each system node. The initializing component 220 may include a parallel construction identifier component 221 for each process, a synchronizer component 222 for synchronizing steps between threads and processes, and a correlation component 223 for determining potential correlation between processes.

An analyzer component 230 may be provided for analyzing the monitored and input data. The analyzer component 230 may include an input component 240 for inputting defined resources 241 of a system node, scheduling policies 242, monitored data 243 from the performance monitoring component 210, and initialization data 244 from the initializing component 220. The scheduling policies 242 may include, for example, thread/process priority; thread binding (thread versus core) (for example, binding all the threads of a process to the same physical core, or each thread on a different physical core; scheduling the threads based on the numbering of the physical or virtual core (consecutively or in a round robin manner), etc.

The analyzer component 230 may also include an analysis trigger component 250 for triggering the analysis and thread adjustment in a system node. The analysis trigger component 250 may include a defined trigger component 251 for identifying when a trigger event occurs, for example, at a time interval, at a synchronization point, at the end of a parallel construction, or according to a user API, etc. A centralizing component 252 may be provided for centralizing the data performance per node or system at the trigger event.

The analyzer component 230 may also include a performance analysis component 260 including an imbalance minimizing component 261 for minimizing imbalance between processes and threaded parallel construction, and a hardware optimization component 262 for optimizing the hardware resource utilization and parameters including the utilization rate of the hardware components of the cores or nodes (for example, memory subsystem, branch unit, Integer unit, Load and Store units, Float point using, instruction decoding, etc.).

An output component 270 may use the output of the analyzer component 230 and may provide adjustments to the system. A thread adjustment component 271 may be provided to adjust the threads for each process on a node. A hardware adjustment component 272 may be provided to adjust the resource utilization and parameters. A runtime adjustment component 273 may be provided to adjust the runtime.

Figure 3:
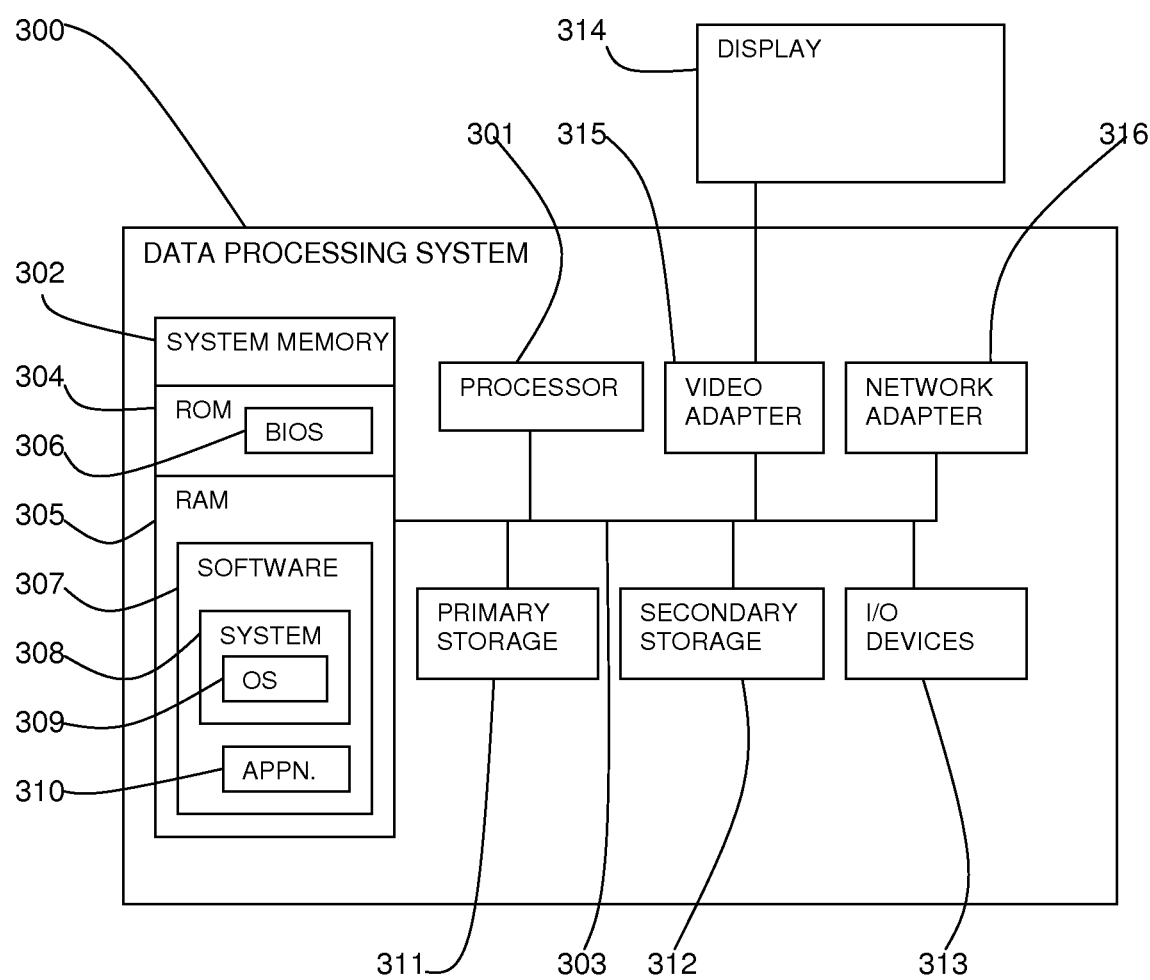
FIG. 3 is a block diagram of a computer system in which the present invention may be implemented.

Referring to FIG. 3, an exemplary system for implementing aspects of the invention includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Referring to FIG. 4A, a flow diagram 400 shows an example embodiment of the described method.

Parallel mixed multi-process/multi-thread applications may be started 401. The application may be started with a defined number of threads per process. This number may be defined by the user at the runtime and is the same for all the processes. In other systems, the processes may be launched with a larger pool of threads, even if some are keep idle by the thread runtime.

The monitoring system is started 402 using monitoring agents which may include: a global agent 403A, process monitoring agents 403B, and hardware metrics monitoring agents 403C.

An initialization step 404 may be carried out in which parallel constructions may be identified, synchronization steps between threads and processes identified, and potential correlations between processes and synchronization steps undertaken.

Optionally, the monitoring information may be used for compiler analysis 405 to gather data for the compiler for the next compilation.

The performance and behaviour of each process and its threads may be continuously monitored 406 and characterized using derived information.

Figure 4B:
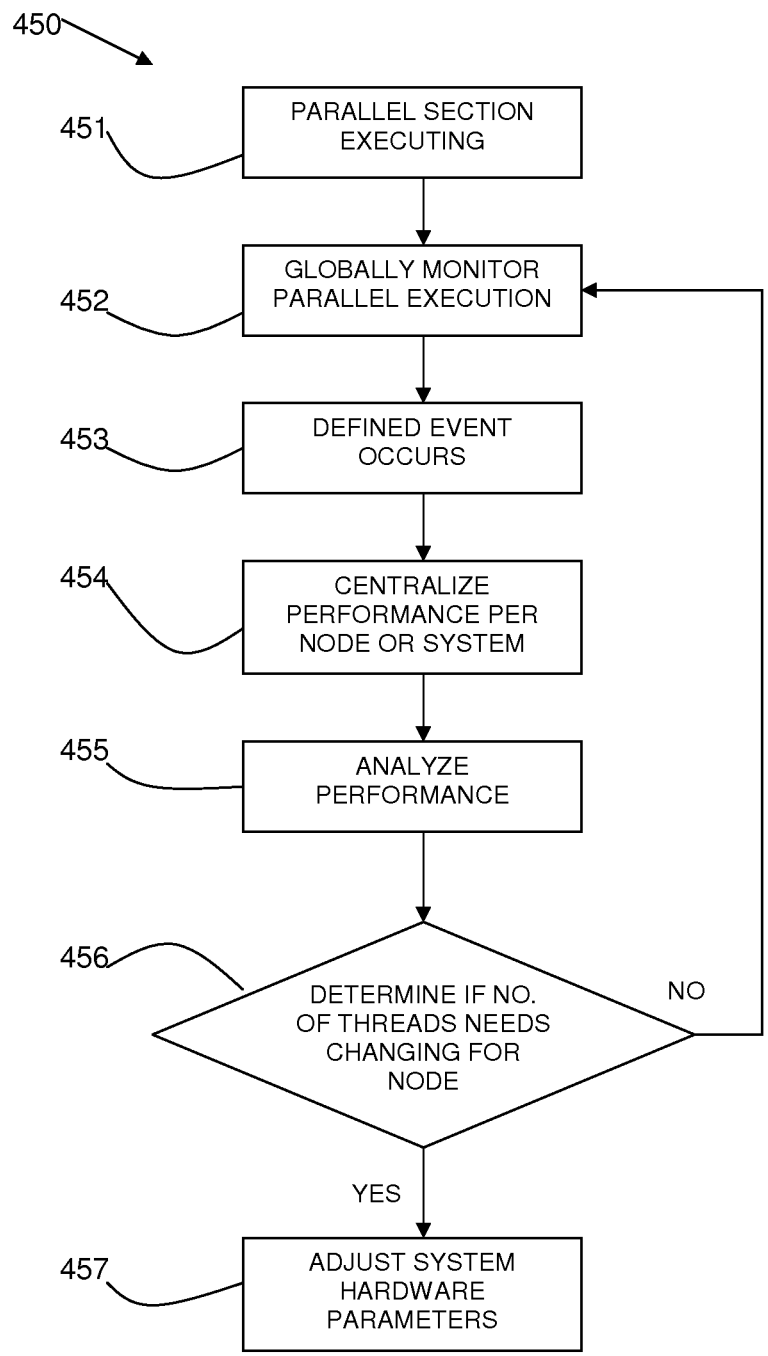

Referring to FIG. 4B, a flow diagram 450 shows an example embodiment of an aspect of the described method.

Most of the HPC applications are a partner where the functions/parts (i.e., parallel section) are executed a large number of times. These parallel sections may be identified and indexed by the system (by itself or using Application Programming Interfaces (API) in the code). Each parallel section may execute 451 with an amount of threads, and globally monitored 452 with the system.

At a defined event 453 (such as a timestep/sample or synchronisation point, end of a parallel construction, or user APIs), the data performance per node or per system may be centralized 454 and analyzed 455.

Based on the behaviour and the user/admin policy, it may be determined 456, per node, whether or not to change the number of threads of some processes, knowing the total number of processes per node. This total number of threads per node can be defined by the user and by the system hardware parameters, for example, the max number of virtual cores for a standard HPC environment.

If it is not determined to change the number of threads, then the monitoring 452 may continue. If it is determined to change the number of threads, then the system hardware parameters may be adjusted 457, for example, by reducing or increasing the number of virtual cores (and implicitly the total of threads on the node). For example, if it is assessed that more simultaneous threads should be run per physical core, the system will potentially adjust the system parameters, the thread binding or memory policy (if possible on the system).

Before entering a parallel section, the runtime may contact the system to identify the parallel section or request the number of threads to activate in his pool, as well as on which physical or virtual cores to execute the threads.

Based of the defined resources allocated to the job and a resource optimization and scheduling policy, data is gathered and analyzed to adjust the number of threads for each process on the node, to reduce the imbalance between processes and threaded-parallel constructions, as well as optimize the hardware resource utilization (optimal number of SMT per core).

Figure 5:
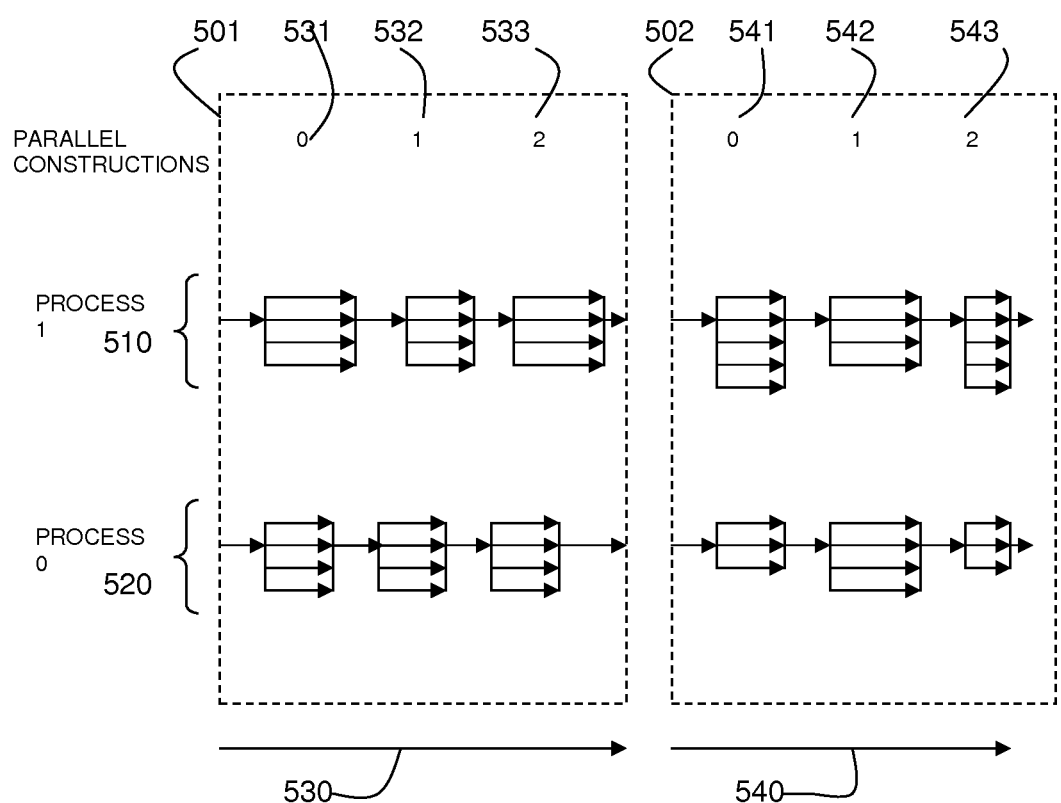
FIG. 5 is a schematic diagram of threads in parallel processes in accordance with the present invention.

FIG. 5 is a schematic diagram which illustrates the dynamic analysis and thread tuning phases defined by default or by the users through environment variables or Application Programming Interfaces (API).

FIG. 5 shows a simple example with two distributed processes 510, 520, each with four threads, and a total of eight threads for each node 501, 502. The partner of the code is shown with the repetition of three parallel sections 531, 532, 533 in a first pass 530 and 541, 542, 543 in a second pass 540 (indexed 0,1,2).

During the first pass 530 the multi-threaded runtime may contact the local agent to identify the sections 531, 532, 533. These sections may be monitored and the global performance may be analysed. The length of the arrows indicates the times. As with many parallel sections there is a synchronisation between the threads.

The thread system management may identify, for instance, an imbalanced between the processes 0 and 1 510, 520 for the parallel constructions 0 and 2 531, 533 and may estimate that the global time can be reduced by adjusting the number of threads between process 0 and 1. This may be done in the next pass 540 by setting five threads in parallel construction 0 and 2 541, 543 for process 1 510 and respectively three threads for process 0 520 (always with a total of eight threads on the node in this example).

This is a simple example scenario for an HPC SPMD application with an imbalance between the processes. Other scenarios may include increasing the number of threads for all the processes and enabling SMT features (more virtual cores) to improve serial efficiency.

An API may allow the targeting of parts of the code to reduce the potential overhead. The gathering and thread tuning phase triggers can be defined by the user using API in the codes or at the beginning of the executions. There is a wide range of possible triggers: at regular time steps, after a repetitive series of parallel constructions, The thread management may be dynamically controlled to active and deactivate the management.

A thread tuning policy may address: an imbalance between the distributed processes or between similar threaded parallel constructions, locally in each node or globally for the system; SMT tuning; type of hardware counters and derived metrics (timers, number of cycles per instructions, Flops, cache misses, IO, etc.).

A thread management system may be provided as a service to a customer over a network.

The overall performance and the parallel scalability strongly depend on the balance between processes. The number of threads per process is dynamically monitored and adapted to balance the processes and therefore optimize the entire application at any given time.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for thread management in parallel processes, comprising:
   initializing each process comprising one or more threads that are executed upon multiple cores or multiple nodes, the initializing including identifying parallel constructions, synchronizing between threads and processes, and identifying potential correlations between processes;
   receiving monitored hardware metrics information from the multiple cores or multiple nodes on which processes are executed, wherein the monitored hardware metrics comprise specific monitored hardware counts, the counts retrieved from respective counters from each core or node, wherein the counters are registers that store the specific monitored hardware counts;
   receiving monitored process and thread information;
   using the monitored process and thread information for compiler analysis for a next compilation;
   globally monitoring the processing across the multiple cores or multiple nodes;
   analyzing the monitored information to minimize imbalances between the multiple cores or multiple nodes or to improve core or node exploitation; and
   dynamically adjusting the number of threads per process based on the analysis.

2. The method as claimed in claim 1, wherein the monitored hardware metrics information further comprise utilization rates of hardware components of the cores or nodes.

3. The method as claimed in claim 1, wherein analyzing the monitored information applies scheduling policies.

4. The method as claimed in claim 1, wherein the initializing is triggered by the system code using Application Programming Interfaces (APIs).

5. The method as claimed in claim 1, further comprising:
   receiving a defined trigger event at which the analyzing is carried out, where the trigger event is one of the group of: a given time period, a synchronization point, an end of a parallel construction, a user Application Programming Interface (API) input, or other event.

6. The method as claimed in claim 1, further comprising:
   determining that the number of threads per process is to be changed;

adjusting system hardware parameters based on the analysis.

7. The method as claimed in claim 1, wherein before entering a parallel section, identifying the number of threads to activate in a node and on which cores or nodes to execute the threads.

8. A computer program stored on a computer readable medium and loadable into the internal memory of a digital computer, comprising software code portions, when said program is run on a computer, for performing the method of claim 1.

9. The method as claimed in claim 1, wherein adjusting the number of threads per process comprises adjusting a number of virtual cores associated with the threads.

10. The method as claimed in claim 1, wherein the number of threads per core or node may be increased or decreased by enabling or disabling a hardware multi-threading mechanism that allows simultaneous threads per core or node.

11. A system for thread management in parallel processes in a multi-core and multi-node system, comprising:
 multiple processor cores or nodes;
 initializing agents to initialize each process comprising one or more threads that are executed upon the multiple cores or multiple nodes, the initializing including identifying parallel constructions, synchronizing between threads and processes, and identifying potential correlations between processes;
 hardware metrics monitoring agents for monitoring hardware metrics on each of the multiple processor cores or nodes, wherein the monitored hardware metrics comprise specific monitored hardware counts, the counts retrieved from respective counters from each core or node, wherein the counters are registers that store the specific monitored hardware counts;
 process and thread monitoring agents for monitoring the process and threads running on the multiple processor cores or nodes;
 a compiler analysis component for receiving information from the process and thread monitoring agents for compiler analysis for a compiler for the next compilation;
 a global monitoring agent for globally monitoring the processing across the multiple cores or multiple nodes;
 a thread management system including:
 an analyzer component for analyzing the monitored information to minimize imbalances between the multiple cores or nodes or to improve core or node exploitation; and
 a thread adjustment component for dynamically adjusting the number of threads per process based on the analysis.

12. The system as claimed in claim 11, wherein the thread management system includes a defined trigger component for receiving a defined trigger event at which the analyzing is carried out.

13. The system as claimed in claim 11, wherein the thread management system includes a hardware adjustment component for adjusting system hardware parameters based on the analysis.

14. The system as claimed in claim 11, wherein adjusting the number of threads per process comprises adjusting a number of virtual cores associated with the threads.

15. The system as claimed in claim 11, wherein the number of threads per core or node may be increased or decreased by enabling or disabling a hardware multi-threading mechanism that allows simultaneous threads per core or node.

\* \* \* \* \*